Dec. 29, 1964  H. L. LINDABERRY  3,163,333
VALVE MEANS FOR AGRICULTURAL FEEDERS AND SPREADERS
Filed Jan. 4, 1962
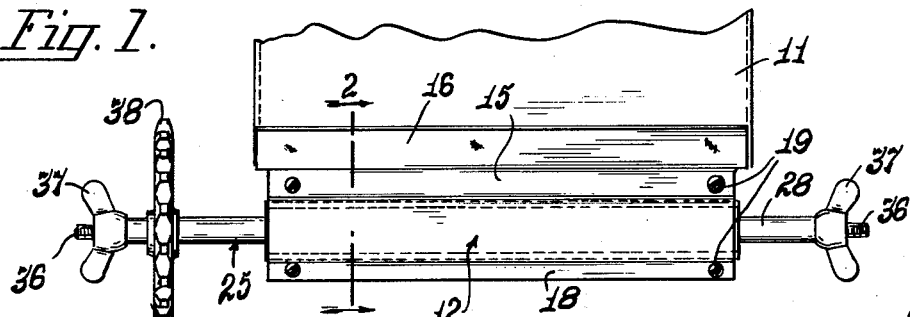
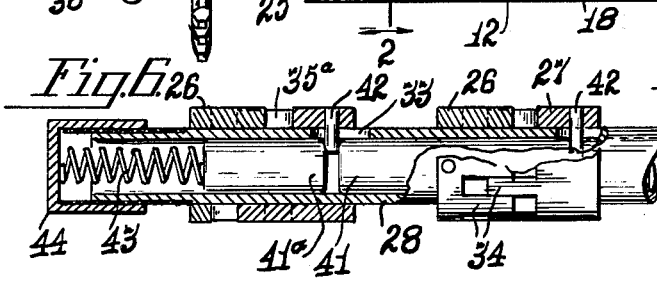
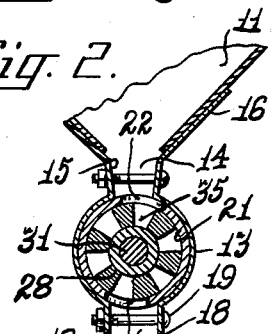
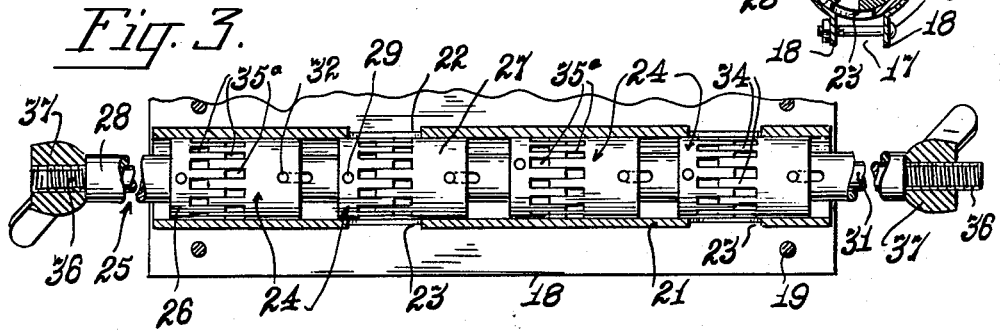
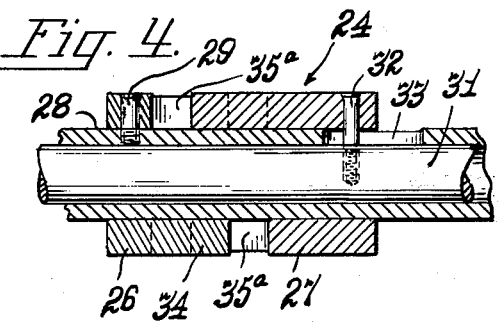
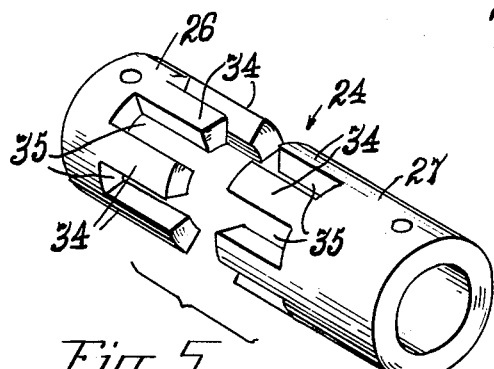
Inventor.
HAROLD L. LINDABERRY
By: Charles H. Redman
Attorney.

United States Patent Office 3,163,333
Patented Dec. 29, 1964

3,163,333
VALVE MEANS FOR AGRICULTURAL FEEDERS AND SPREADERS
Harold L. Lindaberry, 913 Gleason Ave., Aurora, Ill.
Filed Jan. 4, 1962, Ser. No. 164,355
4 Claims. (Cl. 222—268)

This application is a continuation-in-part of my pending applications Serial No. 85,371, filed January 27, 1961, now abandoned and Serial No. 98,182, filed March 24, 1961, now abandoned.

The invention herein disclosed and described in exemplary embodiments, relates to improvements in feed mechanism for agricultural feeders and spreaders, and is more particularly concerned with the novel construction and assembly of valve mechanism of a kind that may be adjusted easily and quickly to vary the quantity of material delivered at any given operating speed. Various granular and/or fluid chemicals, such as different grades of fertilizers, insecticides, weed killers, etc., require different rates of application in variable quantities, determined also by the specific crop to which they are applied. Because the valve mechanism of the feeder or spreader is driven at a speed comparable to the speed at which the apparatus is advanced over the ground, the present apparatus contemplates a valve structure that is readily adjusted so as to afford constant control over the amount of material dispensed by the said mechanism irrespective of the rate of speed of the apparatus. Only in this manner can a predetermined quantity of material be spread over a given area.

The present apparatus has the further advantage of embodying novel means whereby one or more of a plurality of valve elements therein contained may be rendered ineffective so as to adapt the apparatus for spreading one, two or more rows of material, and also means to adjust the delivery opening to and from the valve elements so as to further control the flow of material therethrough.

The invention has for a further advantage, the provision of an adjustable valve element which is a novel construction and assembly and one that may be adjusted easily and quickly without dismantling the apparatus or any part thereof.

A further advantage arising from the present valve mechanism assembly is the provision of novel friction means preferably in the form of a resiliently deformable shape-retaining sleeve within which the valve elements are rotated and which requires no sealing gaskets or packing glands to prevent leakage or spillage.

The structure by means of which the above noted and other advantages of the invention are attained will be described in the following specification, taken in conjunction with the accompanying drawings, showing preferred illustrative embodiments of the invention and in which like numerals are used to identify corresponding parts.

In the drawings:

FIG. 1 is a fragmentary side elevational view of one embodiment of a feeder or spreader apparatus, embodying the valve assembly of the invention;

FIG. 2 is a vertical sectional detail view taken on line 2—2 of FIG. 1;

FIG. 3 is a longitudinal sectional view of the valve assembly, on an enlarged scale, and showing the valve elements in elevation;

FIG. 4 is an enlarged diametrical sectional view of one of the valve elements;

FIG. 5 is a perspective view of a valve element, showing its component parts separated; and, FIG. 6 is a fragmentary sectional view of a modified form of valve assembly, showing parts in elevation.

Referring to the feeder or spreader assembly best illustrated in FIGS. 1 and 2, the spreader apparatus includes a feed hopper 11 having the novel valve assembly, generally indicated at 12, secured firmly to its lower or discharge end. As shown, the valve assembly may include a pair of like, but oppositely shaped, sheet metal halves matched to provide an elongated cylindrical body 13 having a longitudinal inlet 14 at its upper end defined by upstanding wall portions 15 that terminate in outwardly flared flanges 16 which are welded or otherwise secured firmly to the walls of hopper 11. The bottom of body 13 has a longitudinal outlet 17 defined by depending flanges 18. The two body halves are held together, in addition to their securement to hopper 11, by means of bridging bolts 19 that extend through the opposed pairs of wall portions 15 and flanges 18. These bolts have an additional function to be made apparent presently.

Telescoped within cylindrical body 13, is a sleeve liner 21. This sleeve liner may be fabricated from any suitable material in the form of a tube and preferably is made of substantially rigid shape-retaining plastic material such as polyurethane, or like material, preferably having the properties of extreme toughness, resistance to wear and self-lubricating properties. The sleeve liner 21 has one or more pairs of diametrically opposed openings 22, 23, which preferably are rectangular in shape and are spaced apart longitudinally of said sleeve. In the present disclosure (FIG. 3) only two pairs of openings 22, 23, are illustrated. A plurality of valve elements 24, best shown in detail in FIGS. 4 and 5, are mounted on a rod-sleeve assembly 25 and are longitudinally spaced apart so as to be in registering alignment with sleeve openings 22, 23.

In the FIG. 3 disclosure there are four valve elements 24, and but two pairs of openings 22, 23, consequently only the valve elements in register with said openings function to dispense material during operation of the spreader. The relationship of the pairs of openings 22, 23, to inlet 14 and outlet 17 may be varied to suit various feed requirements of different material by loosening bolts 19 and rotating the sleeve liner to increase or decrease the effective opening and then tightening said bolts to secure the sleeve liner in its adjusted position firmly.

Referring now to the specific construction and function of valve elements 24, best shown in FIGS. 4 and 5, each element is comprised of a pair of component cylindrical parts 26, 27, both telescoped over the rod-sleeve assembly 25. These elements also are fabricated from suitable tough, wear resisting plastic material. One element part, for example, part 26, is secured firmly to the sleeve 28 of said rod-sleeve assembly as by means of a thread-mounted pin 29. The companion valve part 27 is secured firmly to the rod 31 of said rod-sleeve assembly in opposed relation to part 26, as by means of a thread-mounted pin 32 which extends through a longitudinally extending slot 33 in sleeve 28.

The opposed complemental valve parts 26, 27 have their opposed end faces formed with circumferentially spaced teeth 34 having spaces 35 between them. The teeth 34 and spaces 35 are substantially alike in width and they extend a considerable distance inwardly longitudinally from the end face upon which they open. As perhaps best shown in FIGS. 3 and 4, the teeth 34 on one of said valve parts 26, 27 are adapted to slidingly fit snugly in the spaces or slots 35 of the companion part.

The amount or degree of inter-meshing of the teeth and slots is controlled by relative longitudinal movement between sleeve 28 and rod 31. When the complemental parts, 26, 27 are moved toward one another, the portion of the spaces 35 not occupied by the related tooth 34 telescoped therein is reduced in size, whereas when the parts are moved away from one another the unoccupied space size increases. These variably adjustable unoccupied spaces constitute feed pockets 35a. Relative movement of sleeve 28 and rod 31 may best be accomplished by extending the rod 31 beyond the ends of sleeve 28 and providing said extended portions with external threads 36. A wing nut, or other member 37, is threaded onto each threaded rod end. It should be quite apparent, upon reference to FIG. 3, that by adjusting the wing nuts 37 in one direction or the other, one or the other of said nuts will abut the related end of sleeve 28 and thus impart relative longitudinal shifting of the rod and sleeve, and of course, the complemental valve parts carried thereby. When adjusted, both wing nuts are tightened to lock the parts in their adjusted position.

In operation, the rod-sleeve valve-element assembly is rotated as a unit within sleeve liner 21 through a chain drive connected to a sprocket 38 mounted firmly on sleeve 28. It should be evident that when the valve assembly is rotated, material from hopper 11 passes through the sleeve liner opening or openings 22 and fills the pockets 35a in the related valve element as they pass therebeneath. As the pockets are carried around into position over the related sleeve liner opening 23, the material in said pockets is discharged therefrom and distributed over the surface being treated. Owing to the adjustability of the effective size of the openings 22, 23, and the ready adjustment of the size of pockets 35a, the quantity of material discharged can be critically controlled irrespective of the grade size of the granular particles. Because the sprocket 38 is ordinarily connected with the drive of the apparatus, its rate of rotation is increased or decreased in direct proportion with an increase or decrease in driving speed.

The FIG. 6 disclosure is substantially like the one described hereinabove except that the rod 31 is dispensed with and instead, relative movement of the parts 26, 27 of the valve elements is effected by means of free sliding spacers 41 arranged within sleeve 28 and each of a length to extend between the radially inwardly extending pins 42 projecting through slots 33 in sleeve 28 and anchored in one valve part 27. At the extreme ends of sleeve 28 (only one end shown) a compression spring 43 is disposed between an end spacer 41a and a cap 44 that is screwthreaded onto sleeve 28 for adjustment to adjustably shift spacers 41–41a, and of course valve parts 27, relative to the sleeve and the complemental valve parts 26 secured to said sleeve.

Although the invention has been described in detail in its various embodiments, and specifically illustrated in the accompanying drawings, it is to be understood that the invention is capable of embodying a wide variety of modifications in its detail construction and that it is not desired to limit the invention to the disclosure but to include in its scope such structures as will fall within the scope of the appended claims.

What I claim and desire to secure by Letters Patent of the United States is:

1. A spreader for flowable material comprising, in combination, a hopper having a substantially cylindrical intermediate body portion substantially coextensive with its bottom, said body portion being in flow communication with the hopper, a discharge slot at the bottom of said body portion, a tubular liner in said body portion having diametrically opposed openings in its wall adapted to be positioned in a predetermined relation to the discharge slot, means to secure said tubular liner rotatably adjusted so as to control the effective size of the discharge, a cylindrical valve element in said tubular liner in registering alignment with the openings in the liner wall, a sleeve mounting said valve element, means to rotate said sleeve and valve element, material receiving pockets in the valve element adapted to receive material from the hopper and carry it to the discharge slot, said valve element comprising two complemental parts opposed to one another endwise and having mating teeth on opposed faces to define said pockets, one of said valve parts being secured to said sleeve, a pin on the other valve part extending inwardly through a slot in the sleeve, and adjustable spring tensioned means in said sleeve engageable with the pin to urge the said other part toward and away from the secured part to adjust the size of the pockets.

2. A spreader for flowable material comprising, in combination, a hopper, a casing attached to the underside of said hopper, said casing having a substantially cylindrical intermediate body portion substantially coextensive with the hopper bottom and an inlet slot at the top of the body portion in flow communication with the hopper, a discharge slot at the bottom of said body portion, a tubular liner in said body portion having diametrically opposed openings in its wall adapted to be positioned in a predetermined relation to the inlet and discharge slots, means to secure said tubular liner rotatably adjusted so as to control the effective size of the inlet and discharge, a cylindrical valve element in said tubular liner in registering alignment with the openings in the liner wall, a sleeve mounting said valve element, means to rotate said sleeve and valve element, material receiving pockets in the valve element adapted to receive material from the hopper and carry it to the discharge slot, said valve element comprising two complemental parts opposed to one another endwise and having mating teeth on opposed faces for defining said pockets, one of said valve parts being secured to said sleeve, a pin on the other valve part extending inwardly through a slot in the sleeve, and adjustable spring tensioned means in said sleeve engageable with the pin to urge the said other element toward and away from the secured part to adjust the size of the pockets.

3. A valve assembly for a spreader of flowable material, said assembly comprising a substantially cylindrical body having diametrically opposed inlet and outlet openings, a plurality of longitudinally spaced cylindrical valve elements in said cylindrical body one of which is in registering alignment with each set of body openings, said valve elements each comprising two parts arranged endwise one to the other and having mating teeth on opposed faces to define pockets in the spaces between the teeth, said parts being movable axially relative to each other to vary the size of the pockets, a sleeve mounting said valve elements, means securing one part of each element to the sleeve, said sleeve having longitudinal slots one underlying the other part of each element, a pin on each of said other parts extending into the sleeve through its respective slot, a plurality of plungers arranged in said sleeve, one between adjacent pins and one outwardly of the endmost pins, springs one in each end of said sleeve abutting the endmost plungers, and means to adjust the tension of said springs to shift the plungers longitudinally of the sleeve to adjust the relative positions of the fixed and movable parts of each valve element, and means to rotate the sleeve and the valve elements thereon.

4. In a spreader for flowable material, a tubular housing having diametrically opposed openings in its side walls, a sleeve telescoped in said housing, a valve element arranged on said sleeve, said valve element comprising two parts opposed endwise one relative to the other, a series of circumferentially spaced teeth formed on opposed faces of said valve parts, the teeth of one part being telescoped into the spaces between the teeth of the other related part, means securing one of said parts to said sleeve, said sleeve having a longitudinal slot underlying the other valve part, a pin on said other valve part extending into said sleeve through said slot, a pusher bar within said sleeve in abutment at one end with said pin, and adjustable spring means in said sleeve operable to urge the bar against the pin to vary the degree of telescoping of said teeth, the spaces unoccupied by the teeth defining pockets to receive flowable material, and means to rotate said sleeve and the valve element thereon.

References Cited by the Examiner

UNITED STATES PATENTS

| Re. 4,307 | 3/71 | Younglove | 222—303 X |
| 500,323 | 6/93 | Esler | 222—317 X |
| 557,987 | 4/96 | Frank | 222—283 |
| 2,115,167 | 4/38 | Hoke | 222—268 |

FOREIGN PATENTS 900,000  6/45  France.

LOUIS J. DEMBO, *Primary Examiner.*

LAVERNE D. GEIGER, *Examiner.*